(12) United States Patent
Dai

(10) Patent No.: US 7,715,209 B2
(45) Date of Patent: May 11, 2010

(54) EXPANSION CARD RETENTION ASSEMBLY

(75) Inventor: Bin Dai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/247,184

(22) Filed: Oct. 7, 2008

(65) Prior Publication Data

US 2009/0296363 A1 Dec. 3, 2009

(30) Foreign Application Priority Data

May 27, 2008 (CN) .................... 2008 1 0301791

(51) Int. Cl.
  H05K 7/14 (2006.01)
  H05K 7/18 (2006.01)
(52) U.S. Cl. ...................... 361/801; 361/802
(58) Field of Classification Search ......... 361/801–802, 361/756, 727, 600, 737, 807, 810, 752, 790, 361/797, 800
  See application file for complete search history.

(56) References Cited

U.S. PATENT DOCUMENTS

| 5,317,483 | A | * | 5/1994 | Swindler | 361/801 |
| 5,967,466 | A | * | 10/1999 | Osborne et al. | 248/27.1 |
| 6,182,835 | B1 | * | 2/2001 | Chen | 211/13.1 |
| 6,480,392 | B1 | * | 11/2002 | Jiang | 361/755 |
| 6,608,765 | B2 | * | 8/2003 | Vier et al. | 361/801 |
| 7,120,028 | B2 | * | 10/2006 | Hsu | 361/726 |

\* cited by examiner

Primary Examiner—Hung S Bui
(74) Attorney, Agent, or Firm—Clifford O. Chi

(57) ABSTRACT

An exemplary retention assembly includes a latch structure and a latch holder. The latch structure is formed on a platform. The latch structure has an engaging portion and a latching portion. The latch holder has a holding protrusion, a pushing portion, and an engaging portion. The holding protrusion is configured for engaging with the latching portion of the latch structure. The elastic pushing portion is configured for causing the latch holder to engage with or disengage from the engaging portion of the latch structure. The engaging portion is configured for engaging with the engaging portion of the latch structure. The latch holder is rotatable around the latching portion of the latch structure.

17 Claims, 6 Drawing Sheets

EXPANSION CARD RETENTION ASSEMBLY

BACKGROUND OF THE INVENTION

1. Field of the Invention

The present disclosure generally relates to retention assemblies, particularly to an expansion card retention assembly for securing expansion cards to an electronic device enclosure.

2. Description of the Related Art

Referring to FIG. 6, a typical retention assembly used for securing expansion cards 10 to an electronic device enclosure 13 is shown. The retention assembly includes a catching plate 11, a plurality of screws 12, and a plurality of covers 14. The electronic device enclosure 13 forms an expansion card platform 130 for mounting the expansion cards 10. The expansion card platform 130 defines a plurality of vertical expansion slots (not shown). A bulge 132 is formed at a bottom of each expansion slot. The covers 14 are configured for covering the expansion slots. Each of the covers 14 is an elongated piece having a bent top end and a narrowed bottom end (not labeled) engaging in the corresponding bulge 132. When one or more expansion cards 10 are fixed to the electronic device enclosure 13, the catching plate 11 is positioned on the bent top ends of the covers 14. The catching plate 11 is then fixed on the electronic device enclosure 13 by the screws 12 being engaged in screw holes defined in the expansion card platform 130, thereby fastening the covers 14 to the electronic device enclosure 13. Each expansion card 10 has a mounting portion 102 having a structure similar to the cover 14, so that the expansion cards 10 may be fastened to the electronic device enclosure 13.

In the above retention assembly, the covers 14 and the expansion cards 10 are secured to the electronic device enclosure 13 by using the screws 12. However, installing or removing the screws 12 is unduly time-consuming and laborious. This decreases the efficiency of installation and removal of expansion cards. In addition, a tool for installing or removing the screws 12 is usually needed. These problems are multiplied in mass production facilities. In addition, after a period of time, the screws 12 may become displaced and no longer be reliably engaged in the screw holes.

Therefore, a retention assembly which overcomes the above-described shortcomings is desired.

SUMMARY

A retention assembly includes a latch structure and a latch holder. The latch structure is formed on a platform. The latch structure has an engaging portion and a latching portion. The latch holder has a holding protrusion, a pushing portion, and an engaging portion. The holding protrusion is configured for engaging with the latching portion of the latch structure. The elastic pushing portion is configured for causing the latch holder to engage with or disengage from the engaging portion of the latch structure. The engaging portion is configured for engaging with the engaging portion of the latch structure. The latch holder is rotatable around the latching portion of the latch structure.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the retention assembly. Moreover, in the drawings, like reference numerals designate corresponding parts throughout the several views.

DETAILED DESCRIPTION OF THE EMBODIMENTS

Figure 1:
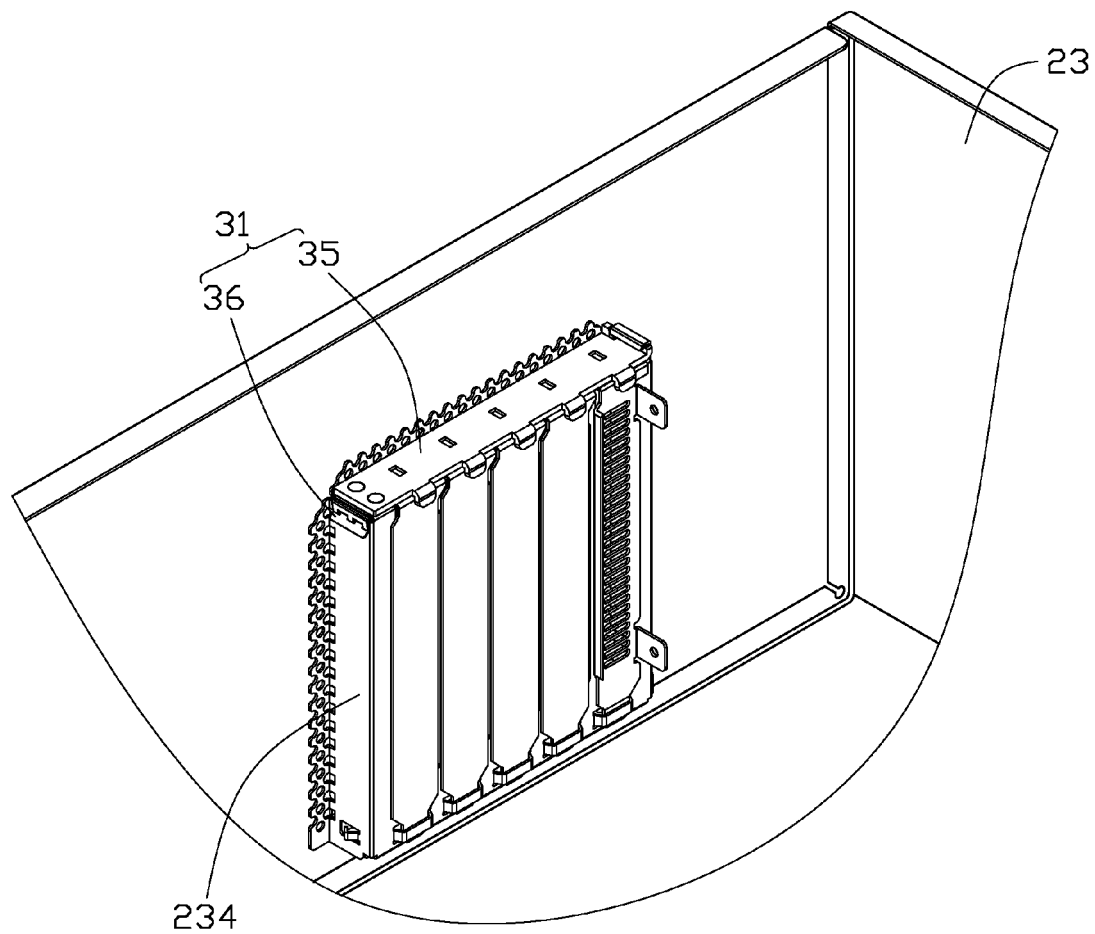
FIG. 1 is an isometric view of one embodiment of a retention assembly in an enclosure, shown fully closed off with a plurality of covers.
Figure 2:
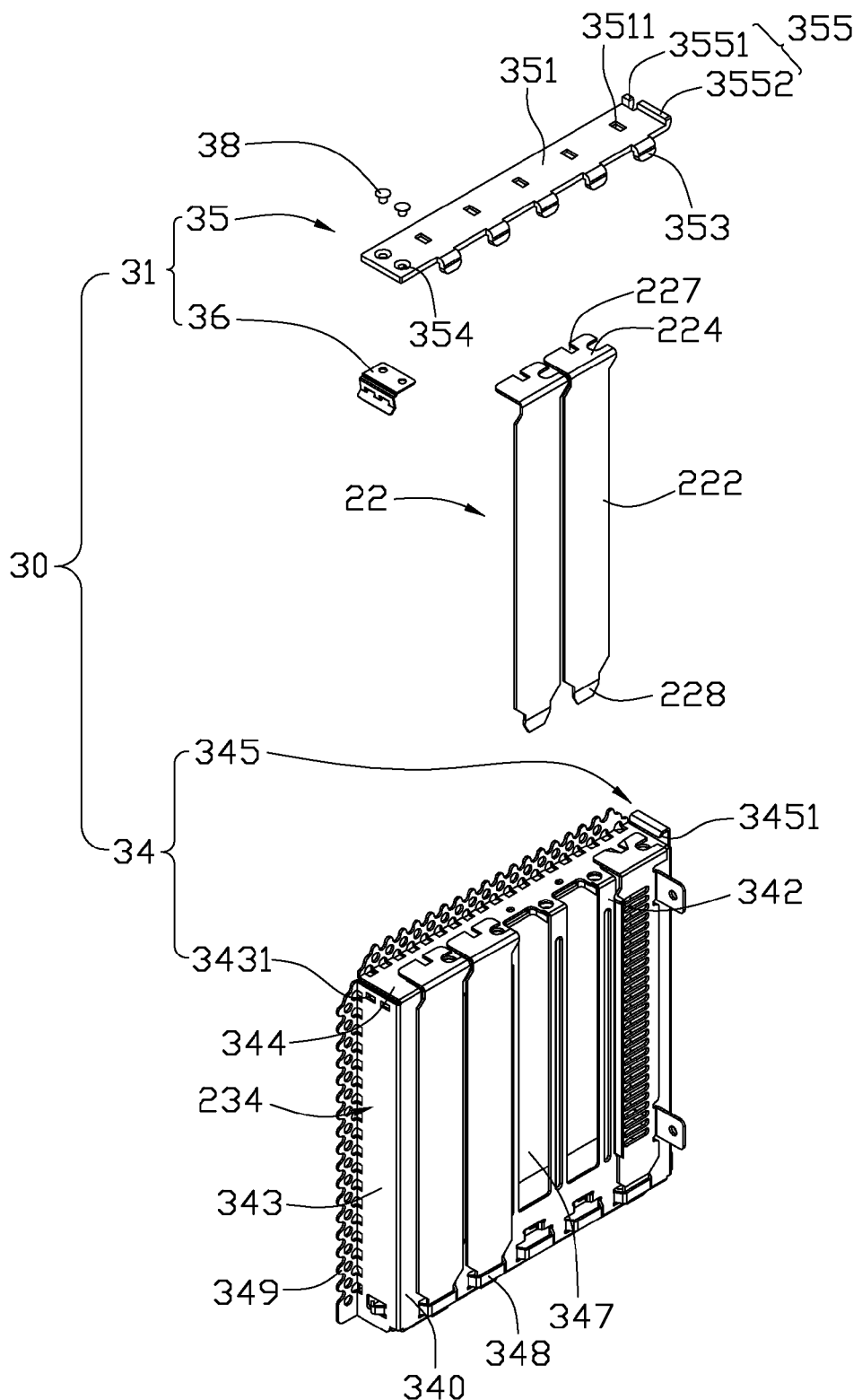
FIG. 2 is an exploded view of the retention assembly of FIG. 1.

Referring to the drawings in detail, FIG. 1 shows one embodiment of a retention assembly 30 of the present disclosure. Referring also to FIG. 2, the retention assembly 30 is configured to fasten covers 22 with expansion cards (not shown) and covers 22 not occupied by expansion cards, to an enclosure 23.

For exemplary purposes, only one cover 22 will be detailed to clearly describe the exemplary embodiment. The cover 22 includes an elongated main portion 222 and a fastening portion 224 extending substantially perpendicularly from a first end of the elongated main portion 222. An edge of the fastening portion 224 defines a notch 227. The notch 227 may be a hole defined in a middle of the fastening portion 224 or a cutout defined at an edge of the fastening portion 224. The cover 22 further includes a tab 228 extending from a second end of the elongated main portion 222 opposite to the fastening portion 224. A width of the tab 228 is smaller than that of the main portion 222. An expansion card is substantially perpendicularly to the main portion 222. In addition, for different kinds of expansion cards, the covers 22 may have different structures.

In one embodiment, an expansion card platform 234 is mounted on a wall of the enclosure 23 on top of an opening (not shown) defined in the enclosure 23. The platform 234 is coupled to the walls of the opening. In another embodiment, the platform 234 may be integrally formed with the walls of the enclosure 23. The platform 234 has a seating surface 340, two sidewalls 343, a top wall 344, and a bottom wall (not labeled). The sidewalls 343, the top wall 344, and the bottom wall extend perpendicularly from four edges of the seating surface 340, with the sidewalls 343 opposite to each other and the top wall 344 opposite to the bottom wall. A connecting portion 349 configured for connecting the platform 234 to the enclosure 23, extends perpendicularly from edges of the sidewalls 343, the top wall 344, and the bottom wall. The platform 234 includes a latching structure 34 having a latching portion 345 and two latching slots 3431. The latching slots 3431 are defined in one of the sidewalls 343 adjacent to the top wall 344. The latching portion 345 extends from an end of another sidewall 343 toward the top wall 344. The latching portion 345 has a latching piece extending at a free end thereof, thus defining an engaging opening 3451. The seating surface 340 defines a plurality of expansion card slots 347 spaced apart from each other, thus forming a plurality of strips 342. A plurality of hooking members 348 is formed on the seating surface 340 adjacent to the bottom wall, corresponding to a bottom of the expansion card slots 347. Each of the hooking members 348 is configured to engagingly receive the tab 228 of the cover 22.

The retention assembly 30 includes the latching structure 34 formed on the platform 234, a resisting member 35, and a detachable latch 36.

Figure 3:
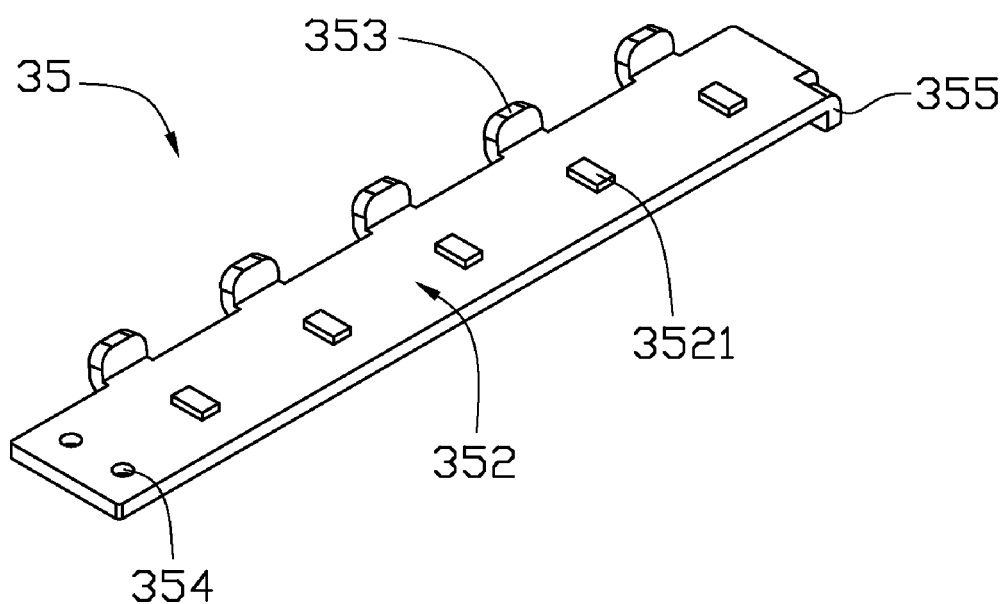
FIG. 3 is an isometric view of a resisting member of the retention assembly of FIG. 2.

Referring also to FIG. 3, the resisting member 35 includes a first surface 351 and a second surface 352 opposite to the first surface 351. The resisting member 35 defines a plurality of depressions 3511 in the first surface 351. The depressions 3511 may be formed by punching, thus forming a corresponding plurality of protrusions 3521 at the second surface 352. In this embodiment, there are five depressions 3511 and five protrusions 3521 spaced from each other and aligned in a straight line. The protrusions 3521 are configured for engaging in the notches 227 of the covers 22. The resisting member 35 further forms a plurality of elastic holding pieces 353 corresponding to the number of the protrusions 3521 at an edge thereof and defines two holes 354 defined in a first end of the resisting member 35 The resisting member 35 forms a holding protrusion 355 at a second end opposite to the first end. The holding protrusion 355 has a limiting block 3551 and an engaging block 3552. The holding pieces 353 and the holding protrusion 355 are perpendicular to the first surface 351, but extending toward opposite directions. The limiting block 3551 is longer than and spaced from the engaging block 3552. The limiting block 3551 is adjacent to an edge opposite to the holding protrusions 355 away from the edge forming the holding protrusions 355. The limiting block 3551 is configured for resisting an end of the latching portion 345, thus preventing the resisting member 35 from moving away from the platform 234. In alternative embodiments, the protrusions 3521 and the holding pieces 353 may be omitted.

Figure 4:
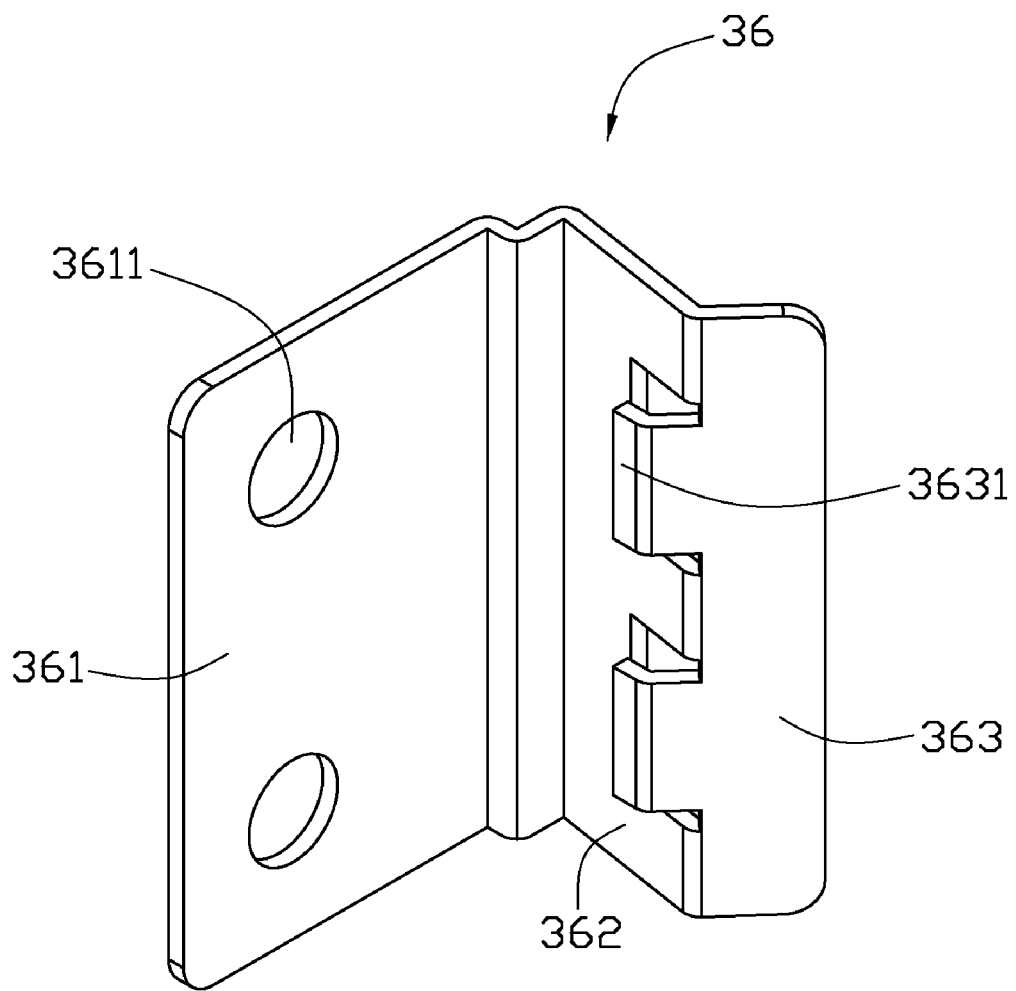
FIG. 4 is an isometric view of a detachable latch of the retention assembly of FIG. 2.

Referring to FIG. 4, the detachable latch 36 includes a fixing portion 361, a hooking portion 362, and a pushing portion 363. The fixing portion 361 extends perpendicularly from a first side of the hooking portion 362, and the pushing portion 363 extends obliquely from a second side opposite to the first side of the hooking portion 362. The fixing portion 361 defines two holes 3611, and the hooking portion 362 forms two hooks 3631. The detachable latch 36 is elastic, thus deformable.

In assembly, the platform 234 is fixed to the wall of the enclosure 23. Two rivets 38 are inserted into the holes 354 of the resisting member 35 and the holes 3611 of the detachable latch 36, then the rivets 38 are riveted. Thus, the detachable latch 36 is fixed to the first end of the resisting member 35 to form a latch holder 31. The hooking portion 362 of the detachable latch 36 extends toward a direction opposite to the extending direction of the holding protrusion 355. In another embodiment, the detachable latch 36 may be fixed to the resisting member 35 by other manners such as welding. In yet another embodiment, the detachable latch 36 and the resisting member 35 may also be integrally formed.

The latch holder 31 defined by the detachable latch 36 and the resisting member 35 is attached to the platform 234 to hold the covers 22 regardless whether the covers 22 are holding or not holding any expansion cards. When the latch holder 31 is attached to the platform 234, the holding protrusion 355 of the resisting member 35 is engaged in the latching portion 345 of the platform 234. Then the resisting member 35 is rotated around the latching porting 345 until the resisting member 35 is substantially parallel to the top wall 344 of the platform 234. The protrusions 3521 of the resisting member 35 engage in the notches 227 of the covers 22, the holding pieces 353 of the resisting member 35 tightly resist an edge of each cover 22, and the hooks 3631 of the detachable latch 36 engage in the latching slots 3431 of the platform 234. The covers 22 are held by the retention assembly 30 with the fastening portion 224 positioned between the resisting member 35 and the top wall 344 of the platform 234.

Figure 5:
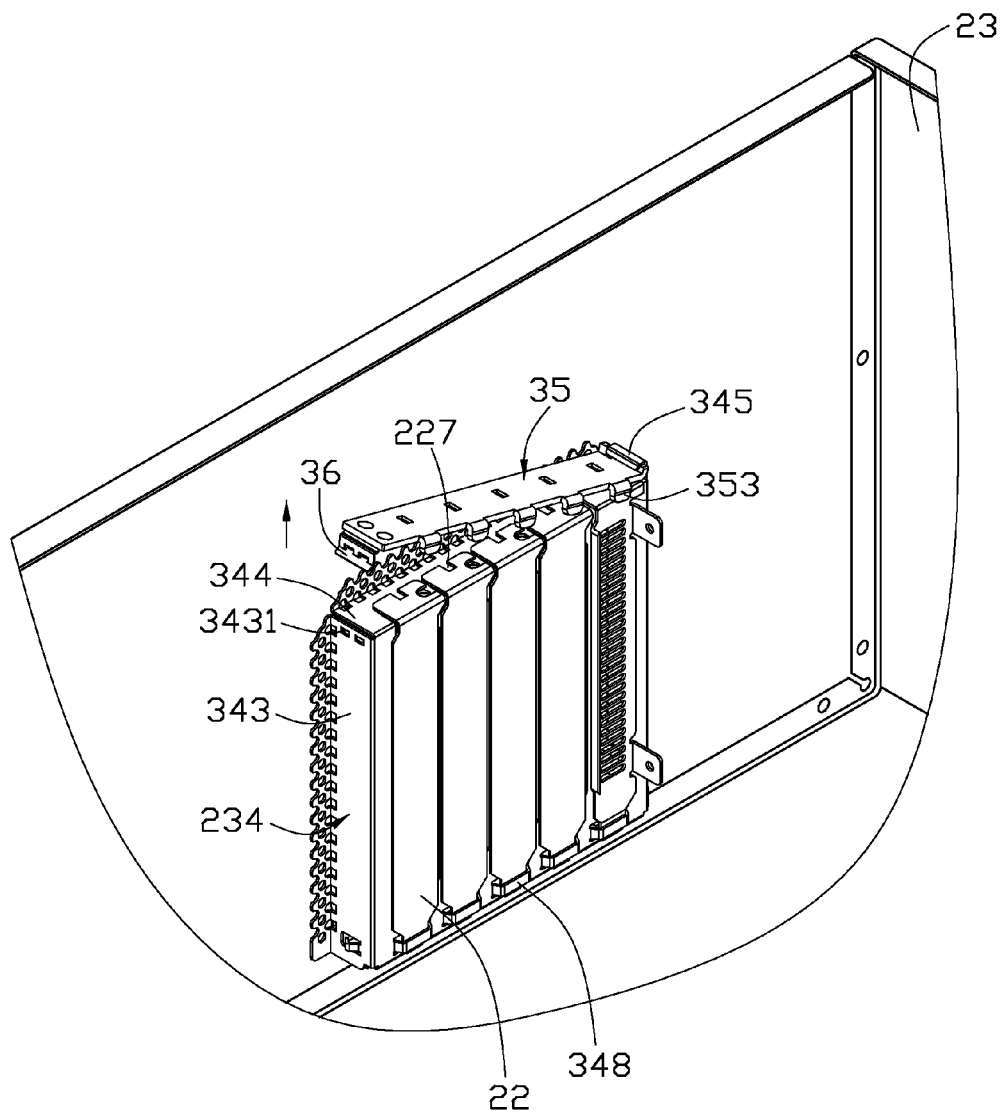
FIG. 5 is similar to FIG. 1, but showing a process of removing/adding a cover.
Figure 6:
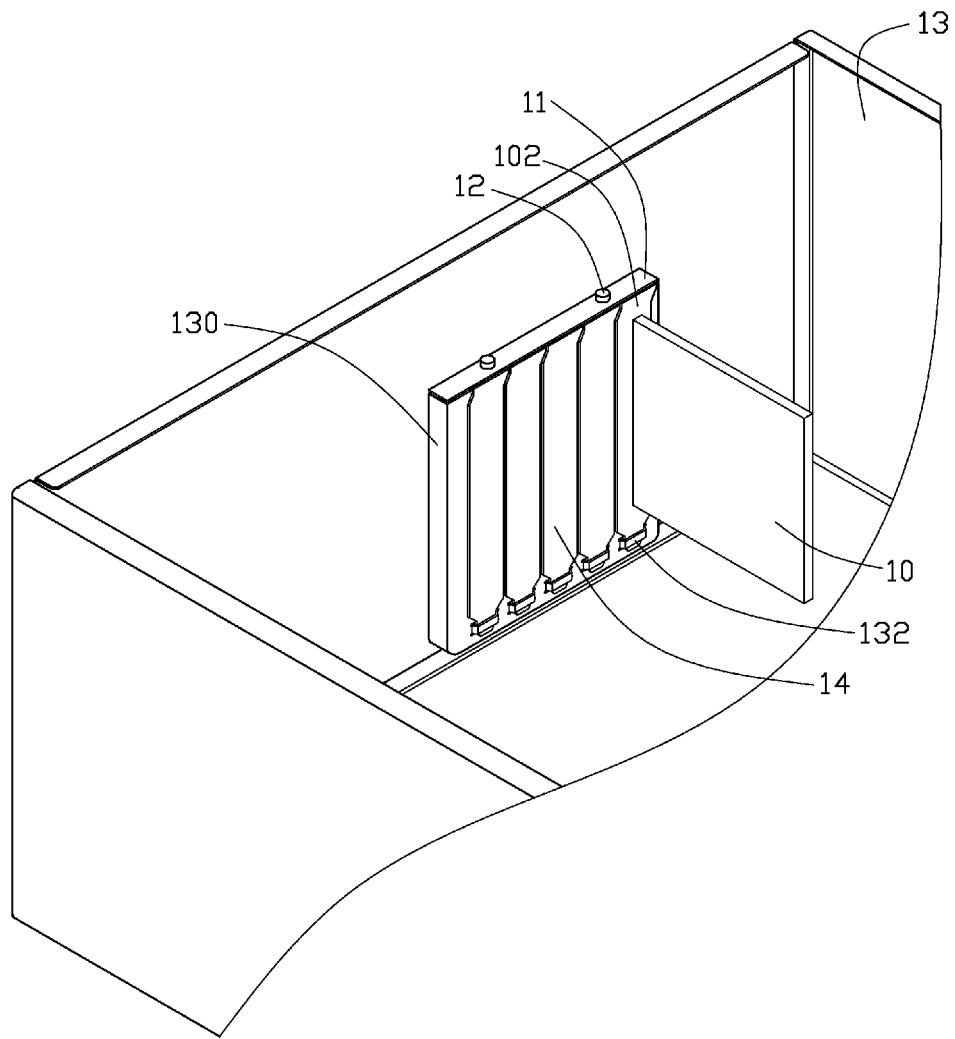
FIG. 6 is an assembled, isometric view of a part of an electronic device enclosure, the enclosure having a typical expansion card retention assembly.

Referring also to FIG. 5, when an expansion card needs to be installed to the enclosure 23, the cover 22 that is free (not holding an expansion card) should be removed from the platform 234 and another cover 22 with an expansion card should be added to the platform 234. Similarly, when an expansion card needs to be removed from the enclosure 23, the cover 22 with an expansion card should be removed from the platform 234 and another cover 22 without an expansion card should be added to the platform 234. When installing or removing the expansion card, the pushing portion 363 of the detachable latch 36 is pulled away from the sidewall 343 of the platform 234 to deform the hooking portion 362 and the pushing portion 363. Thus, the hooks 3631 are disengaged from the latching slots 3431. Then the end of the resisting member 35 forming the detachable latch 36 is lifted and rotated around the latching portion 345, so that the protrusions 3521 of the resisting member 35 disengage from the notches 227 of the covers 22 and the holding pieces 353 of the resisting member 35 disengage from the covers 22. As such, one of the covers 22 may be removed and another cover 22 may be installed.

A cover 22 can be added or removed by pushing the hooks 3631 engaged in the latching slots 3431 or pulling the hooks 3631 to disengage from the latching slots 3431. The operation is very simple, and does not require the use of any tools.

In other embodiments, the hooks 3631 may be formed on the sidewall 343 of the platform 234 and accordingly the latching slots 3431 are defined in the detachable latch 36. The latching slots 3431 may be replaced by hooks engaged with the hooks 3631. In other words, the latching slots 3431 and the hooks 3631 may be replaced by other engaging portions, so long as they can engage with and disengage from each other.

It is believed that the present embodiments and their advantages will be understood from the foregoing description, and it will be apparent that various changes may be made thereto without departing from the spirit and scope of the present disclosure or sacrificing all of its material advantages, the examples hereinbefore described merely being preferred or exemplary embodiments of the disclosure.

What is claimed is:

1. A retention assembly comprising:
   a latch structure formed on a platform, the latch structure comprising an engaging portion and a latching portion; and
   a latch holder comprising a holding protrusion engaging with the latching portion of the latch structure, an elastic pushing portion causing the latch holder to engage with or disengage from the engaging portion of the latch structure, an engaging portion engaging with the engaging portion of the latch structure, a resisting member, and a detachable latch fixed on a first end of the resisting member;
   wherein the holding protrusion of the latch holder is formed on a second end of the resisting member opposite to the first end, the pushing portion and the engaging portion are formed on the detachable latch, the latch holder is rotatable around the latching portion of the latch structure; the holding protrusion comprises a limiting block; the limiting block is longer than and spaced from the engaging block; the limiting block resists an end of the latching portion to prevent the resisting member from moving away from the platform.

2. The retention assembly as claimed in claim 1, wherein the pushing portion elastically deforms away from the platform so that the engaging portion of the latch holder engages with the engaging portion of the latch structure; the pushing portion elastically deforms away from the platform so that the engaging portion of the latch holder disengages from the engaging portion of the latch structure.

3. The retention assembly as claimed in claim 2, wherein the engaging portion of the detachable latch comprises at least one hook, and the engaging portion of the latch structure comprises at least one latching slot defined in the platform.

4. The retention assembly as claimed in claim 3, wherein the resisting member further comprises at least one holding piece formed at an edge thereof.

5. The retention assembly as claimed in claim 4, wherein the holding protrusion comprises an engaging block; the at least one holding piece and the holding protrusion are substantially perpendicular to the resisting member, but extending toward opposite directions.

6. The retention assembly as claimed in claim 1, wherein the limiting block is adjacent to an edge opposite to the holding protrusions and far from the edge forming the holding protrusions.

7. The retention assembly as claimed in claim 3, wherein the detachable latch further comprises a hooking portion, a fixing portion extending substantially perpendicularly from a first side of the hooking portion, and the pushing portion extending obliquely from a second side opposite to the first side of the hooking portion; the hooking portion forms the at least one hook.

8. The retention assembly as claimed in claim 3, wherein the platform comprises a seating surface, two opposite sidewalls, a top wall, a bottom wall opposite to the top wall, and a seating surface extending perpendicularly from four edges of the seating surface.

9. The retention assembly as claimed in claim 8, wherein the latching slots are defined in a first of the sidewalls adjacent to the top wall; the latching portion extends from an end of a second of the sidewalls toward the top wall; the latching portion comprises a latching piece extending at a free end thereof; the seating surface defines a plurality of expansion card slots spaced apart from each other.

10. A retention assembly for mounting covers to a platform, comprising:
   a latch structure formed on the platform, the latch structure comprising an engaging portion and a latching portion; and
   a latch holder comprising a resisting member, and a detachable latch fixed on a first end of the resisting member, the resisting member comprising a holding protrusion formed on a second end of the resisting member opposite to the first end and engaging with the latching portion of the latch structure, and the detachable latch comprising an elastic pushing portion, the pushing portion comprising an engaging portion formed on an edge of the pushing portion and engaging with the engaging portion of the latch structure;
   wherein the holding protrusion comprises a limiting block; the limiting block is longer than and spaced from the engaging block; the limiting block resists an end of the latching portion to prevent the resisting member from moving away from the platform.

11. The retention assembly as claimed in claim 10, wherein the pushing portion elastically deforms away from the platform so that the engaging portion of the latch holder engages with the engaging portion of the latch structure; the pushing portion elastically deforms away from the platform so that the engaging portion of the latch holder disengages from the engaging portion of the latch structure.

12. The retention assembly as claimed in claim 10, wherein the resisting member further comprises at least one holding piece formed at an edge thereof to resist an edge of each cover.

13. The retention assembly as claimed in claim 12, wherein the holding protrusion comprises an engaging block; the at least one holding piece and the holding protrusion are perpendicular to the resisting member, but extending toward opposite directions.

14. The retention assembly as claimed in claim 13, wherein the limiting block is adjacent to an edge opposite to the holding protrusions and far from the edge forming the holding protrusions.

15. The retention assembly as claimed in claim 14, wherein the detachable latch further comprises a hooking portion, a fixing portion extending substantially perpendicularly from a first side of the hooking portion, and the pushing portion extending obliquely from a second side opposite to the first side of the hooking portion; the hooking portion forms the at least one hook.

16. The retention assembly as claimed in claim 10, wherein a plurality of protrusions are formed on a surface of the resisting member; each cover includes an elongated main portion and a fastening portion extending substantially perpendicularly from a first end of the elongated main portion; a notch for engaging with one of the protrusions of the resisting member is defined in the fastening portion.

17. The retention assembly as claimed in claim 16, wherein the platform has a plurality of hooking members; each cover further comprises a tab extending from a second end of the elongated main portion opposite to the fastening portion; each of the hooking members of the platform is configured to engagingly receive the tab of a corresponding one of the covers.

* * * * *